Nov. 26, 1935.  E. A. HARPER  2,022,620

LUBRICATING MECHANISM

Filed June 20, 1933  2 Sheets-Sheet 1

INVENTOR-
E. A. HARPER
BY R. J. Dearborn
HIS ATTORNEY-

Nov. 26, 1935.  E. A. HARPER  2,022,620
LUBRICATING MECHANISM
Filed June 20, 1933  2 Sheets-Sheet 2
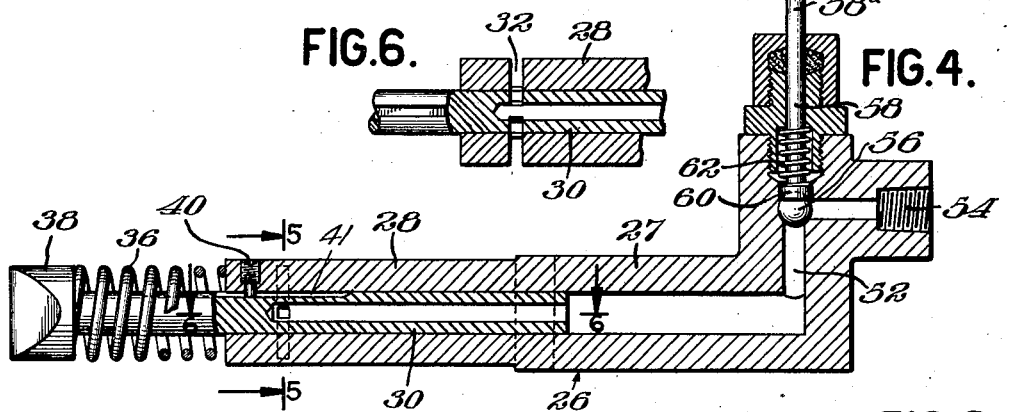
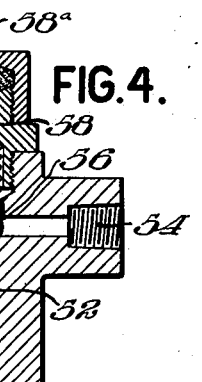
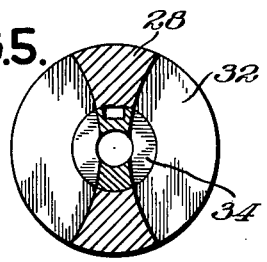
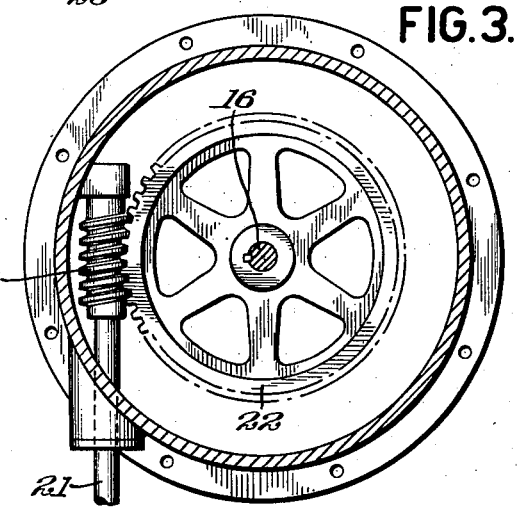
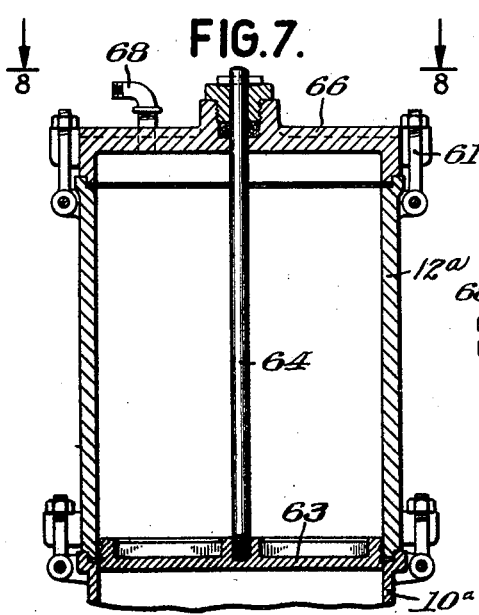
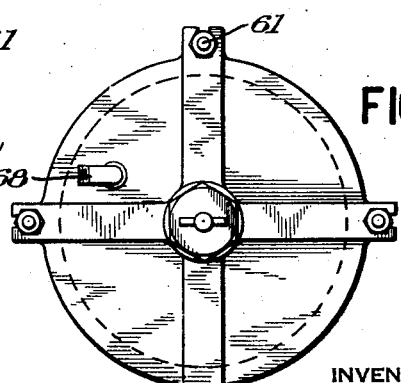
INVENTOR-
E.A. HARPER
BY R. J. Dearborn
HIS ATTORNEY- Patented Nov. 26, 1935

2,022,620

UNITED STATES PATENT OFFICE 2,022,620

LUBRICATING MECHANISM

Edward A. Harper, Atlanta, Ga., assignor to The Texas Company, New York, N. Y., a corporation of Delaware Application June 20, 1933, Serial No. 676,601

4 Claims. (Cl. 184—6)

This invention relates to a new type of lubricating apparatus particularly designed for heavy duty work requiring considerable precision in the quantity of lubricant supplied to each of a number of bearings.

The invention has been found to be especially useful for lubricating from a central source the bearings of steel mill and like equipment.

It is one of the main objects of the invention to provide a mechanism for supplying lubricant to a number of bearings, wherein the lubricant displacement is uniform and positive and wherein the quantity of lubricant supplied to each bearing can be readily adjusted from zero to the maximum output of the unit.

The above and other objects will appear more fully from the following description when considered in connection with the drawings, wherein:

Fig. 1 is a vertical elevational view, parts being in section, showing a preferred adaptation of my invention.

Figs. 2 and 3 are horizontal sectional views taken on the lines 2—2 and 3—3, respectively, of Fig. 1.

Fig. 4 is a vertical sectional view of one of the lubricant pump units.

Fig. 5 is an enlarged sectional view taken on the line 5—5 of Fig. 4.

Fig. 6 is a fragmentary horizontal sectional view taken on the line 6—6 of Fig. 4.

Fig. 7 is a vertical sectional view of a different type of container adaptable to my invention.

Fig. 8 is a plan view of the container shown in Fig. 7.

Figure 1:
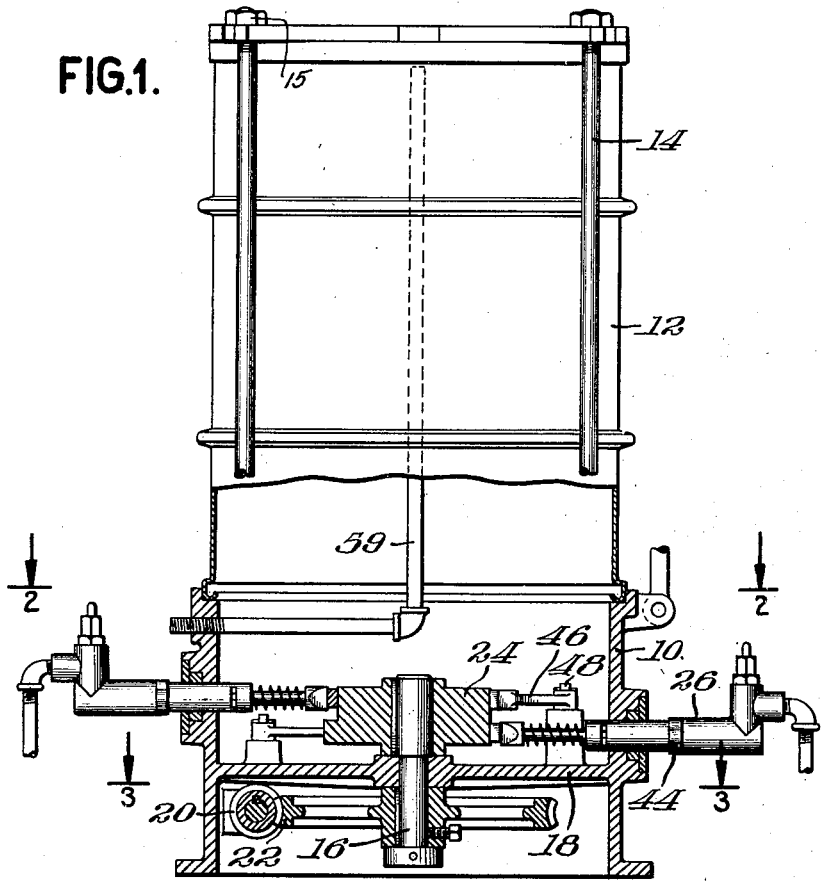

Referring in detail to the drawings, the apparatus comprises a casing 10 for receiving a drum of lubricating material 12 on a suitable flange on the casing. The drum may be held in position by rods 14, provided with adjustment nuts 15, so that the drum may be pulled up tightly against the flange on the casing 10 to prevent leakage at the junction between the drum and casing.

The operating mechanism of the lubricator includes a central shaft 16 rotatably mounted on the bottom wall 18 of the casing 10. The shaft 16 is driven at a relatively slow speed by means of a worm 20 and shaft 21 and a worm nut 22 carried by the shaft 16. The shaft 16, above the diaphragm 18, is provided with a cam member 24 which may be formed with any desired number of cam surfaces. The present apparatus utilizes two longitudinally spaced cam surfaces on the one cam member 24 (see Figs. 1 and 2). Each of the cam surfaces on the cam 24 coacts with a certain number of lubricant pumps 26 positioned radially about the cam, the operating elements of the pumps being spaced vertically so as to engage with either the upper or lower cam surface.

The lubricating pumps 26 are each formed with outer and inner aligned body parts 27 and 28 having a uniform bore therein for receiving the hollow plunger 30, constituting a piston for discharging the lubricant from the pump. The inner cylinder 28 and piston rod 30 are formed with narrow slotted openings 32 and 34, respectively, which are aligned, as shown in Figs. 4 and 5, when the piston 30 is in its inner or loading position. The piston is moved to this position by means of a strong coil spring 36 engaged between the head 38 of the plunger and the body part 28 of the pump. The plunger is maintained in its vertical position by means of a set bolt 40 engaging in a key-way 41 in the plunger 30.

The lubricant pumps are mounted on the casing 10 by having the reduced portions 28 thereof adjustably mounted in separate sealed openings in the side wall of the casing. The pumps are moved to and held in their adjusted position by means of bolts 42 carried by the casing 10 and the adjusting nuts 43 engageable with the cross-arms 44 formed on the pump casings and mounted on the bolts 42. In order to reduce wear on the pistons 30 and to prevent binding of the pistons against the walls of the pump casing, a series of intermediate levers 46, pivoted at 48, have the free ends 50 thereof engaged between the heads 38 of the pump plungers and the actuating surface of the cam 24. The purpose of the levers is to convert the rotative movement of the cam 24 into reciprocating movement of the plungers 30 without undue wear on the pump plungers, or cylinders, and thus to assure uniform operation of the mechanism for long periods of time.

The cylindrical opening in each pump casing 26 communicates with a lubricant duct 52 leading to a terminal 54 to which there is attached a pipe for conducting lubricant to the desired bearing (not shown). The passage 52 is normally closed by means of a ball or other check valve 56 held in position by the valve stem 58 having a recessed head 60 for maintaining the ball 56 in closed position. The valve stem is normally held in closed position by means of the spring 62. The stem 58 extends at 58a into exposed position outside of the pump casing, the valve stem being sealed by means of a sealing nut and gasket to prevent escape of the lubricant. The check valves for closing off the passage 52 are not necessary in every instance but instead it has been found that the mechanism will operate with low viscosity oils and greases, even though the valves 56 are entirely omitted.

Figure 2:
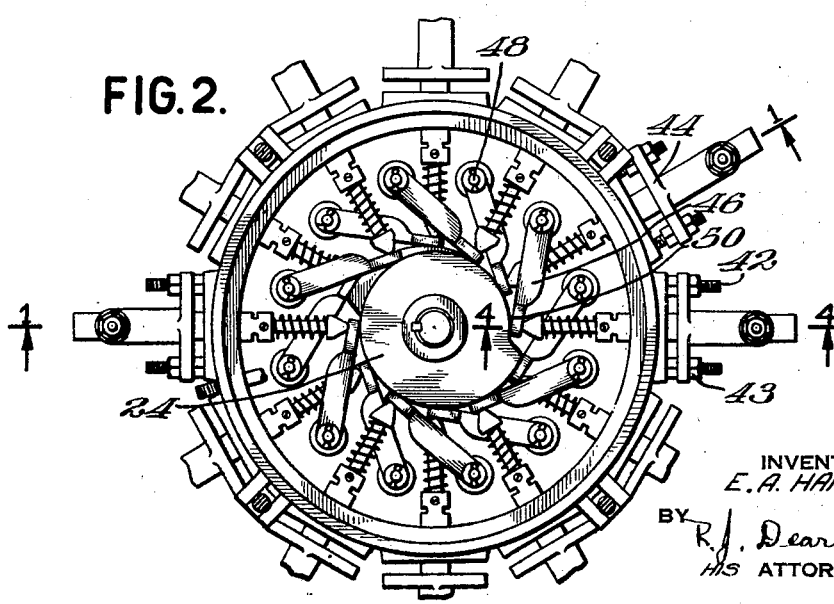

In order to prevent the interior of the drum 12 and casing 10 from becoming air-bound, provision is made for introducing air at atmospheric pressure, or higher if necessary, to the space above the lubricant in the drum 12. This may be readily accomplished by means of a vent pipe 59 supported on the casing 12 and extending to a point near the bottom of the inverted drum 12, as shown in Fig. 1. The pipe 59 may be formed with an air filter, if desired, to prevent dust and grit from entering the casing.

In the operation of the above described mechanism, power may be supplied to the shaft 21 from the mechanism to be lubricated so that the quantity of lubricant supplied will be in accordance with the time and speed of operation of the lubricated mechanism. Obviously, if preferred, a separate motor may be used for driving the shaft 21. As this shaft is rotated, it produces a rotation of the cam 24 at a reduced speed, rotation of the cam 24 in a clockwise direction, as viewed in Fig. 2 gradually moving one of the plungers 30 after another outwardly so as to force any lubricant in the path of the plunger out past the ball valve 56 and through the pipe connection 54 for the successive pumps. When the raised portion of the cam has rotated past the lever 46, the lever and the corresponding pump plunger 30 are moved to their loading position by means of the spring 36 for that particular pump. This movement brings the openings 34 and 32 into alignment and causes a new supply of lubricant to be drawn by suction into the hollow plunger and lubricant passage for the subsequent operation as the cam continues to rotate. The quantity of lubricant supplied to each of the pipes connected at 54 to the various pumps can be readily adjusted merely by adjusting the nuts on the bolts 42 to move the entire pump assembly toward or away from the cam 24. This adjustment requires no disassembling of the lubricating mechanism, and in fact, any pump unit can be adjusted to a point where it would be entirely inoperative or even removed from the casing without interfering with the operation of the remaining pumps. The passage of lubricant through the passages 52 is indicated at the stems 58 so as to give a visual or other indication of the operation of the valve. While the stems 58a are shown as merely exposed, it will be understood that suitable electrical contacting or recording devices may be associated with the exposed portions of the stems 58 to give an indication at a remote control station or to make a record of the period during which lubricant has been supplied through the various ducts 52. Since the drums 12 are brought to the point of use in a sealed condition and the inverted drums with the heads removed placed in sealed condition over the casing 10, the lubricant is distributed in a particularly clean and uncontaminated condition.

The above mechanism is applicable to most grades of oil and grease up to the very heavy or viscous grades, such as those having high heat resisting qualities. If greases of this quality are to be dispensed through the mechanism, a different type of container should be substituted for the drum 12, as shown in Figs. 7 and 8, wherein the special drum 12a, having a uniform interior cylindrical wall, is mounted upon the lower casing 10a. The drum 12a is provided with a follower disc 63 for causing the lubricant to be withdrawn uniformly from the drum. A stem 64 attached to the disc 63 extends upwardly through the removable drum head 66 for guiding the disc in its movements, the head 66 being bolted or otherwise rigidly attached to the casing 60, as shown at 61. For the most types of heavy grease it is sufficient to permit air at atmospheric pressure to enter through the tube 68 into the drum 12a above the disc 63. If particularly heavy greases are to be employed, appropriate pressure may be supplied through the pipe 68.

Obviously, many modifications and variations of the invention, as hereinbefore set forth, may be made without departing from the spirit and scope thereof, and therefore only such limitations should be imposed as are indicated in the appended claims.

I claim:

1. In a lubricating mechanism, a main operating element, a series of individual lubricant pumps operated by said main operating element, means controlled by the relative position of the individual pumps with respect to said main operating element for regulating the volume of lubricant discharged by each of said pumps and means for adjusting the position of said pumps relatively to said main operating element.

2. In a lubricating mechanism, a rotatable operating cam, a reciprocating pump comprising a pump casing and a slidable plunger, and means for adjusting the assembled pump casing and plunger toward or away from said cam.

3. In a lubricating mechanism, a casing, a cam mounted within said casing, means for operating said cam, a series of individually adjustable pumps mounted on said casing in position to be operated by said cam.

4. In lubricating mechanism, a casing, a pumping unit mounted in the wall of the casing and comprising an adjustable cylindrical member extending through the casing wall, a plunger adapted to reciprocate within the cylindrical member for pumping a lubricant therethrough, means on the outer wall of the casing for adjusting and maintaining the pumping unit in any desired position with respect to the casing so as to regulate the quantity of lubricant pumped therethrough.

EDWARD A. HARPER.